United States Patent [19]

Shimizu et al.

[11] 4,371,240
[45] Feb. 1, 1983

[54] MOTION PICTURE CAMERA HAVING AN AUTO-FOCUS ADJUSTING DEVICE

[75] Inventors: Ichiro Shimizu, Tokyo; Yoshio Komine, Yokohama; Makoto Masunaga, Tokyo, all of Japan

[73] Assignee: Canon Kabushiki Kaisha, Tokyo, Japan

[21] Appl. No.: 188,247

[22] Filed: Sep. 17, 1980

[30] Foreign Application Priority Data

Sep. 25, 1979 [JP] Japan .............................. 54-123005

[51] Int. Cl.³ .............................................. G03B 3/00
[52] U.S. Cl. .................................................. 352/140
[58] Field of Search ................................ 352/140, 139

[56] References Cited

U.S. PATENT DOCUMENTS

| | | | |
|---|---|---|---|
| 3,504,965 | 4/1970 | Lustig | 352/140 |
| 3,517,597 | 6/1970 | Rauffer | 352/140 |
| 3,724,937 | 4/1973 | Jenkins et al. | 352/140 |
| 3,871,756 | 3/1975 | Stieringer, et al. | 352/140 |
| 4,093,365 | 6/1978 | Isono | 352/140 |
| 4,103,309 | 7/1978 | Massa | 352/140 |

FOREIGN PATENT DOCUMENTS 50-99729  8/1975  Japan .

*Primary Examiner*—Monroe H. Hayes
*Attorney, Agent, or Firm*—Fitzpatrick, Cella, Harper & Scinto

[57] ABSTRACT

This application discloses a motion picture camera having an automatic focus (auto-focus) adjusting device for automatically focusing a shooting lens on an object. The motion picture camera includes a first manipulating means for selecting one mode of the following three modes, a first mode in which said auto-focus adjusting device is rendered inoperative so that the shooting lens can be manually focused; a second mode in which, in response to the camera release, the shooting lens can be auto-focus adjusted by said auto-focus adjusting device only once and thereafter held at a locked position irrespective of variations in distance between the shooting lens and object; and a third mode in which, throughout a period of the camera release, the shooting lens can be continuously auto-focus adjusted by said auto-focus adjusting device, following the variations in distance between the shooting lens and object, and a second manipulating means effective only in said second and third modes for permitting the shooting lens to be auto-focus adjusted by said auto-focus adjusting device again only once during the camera release in the second mode and for holding the shooting lens at its locked position irrespective of the camera release in the third mode.

14 Claims, 15 Drawing Figures

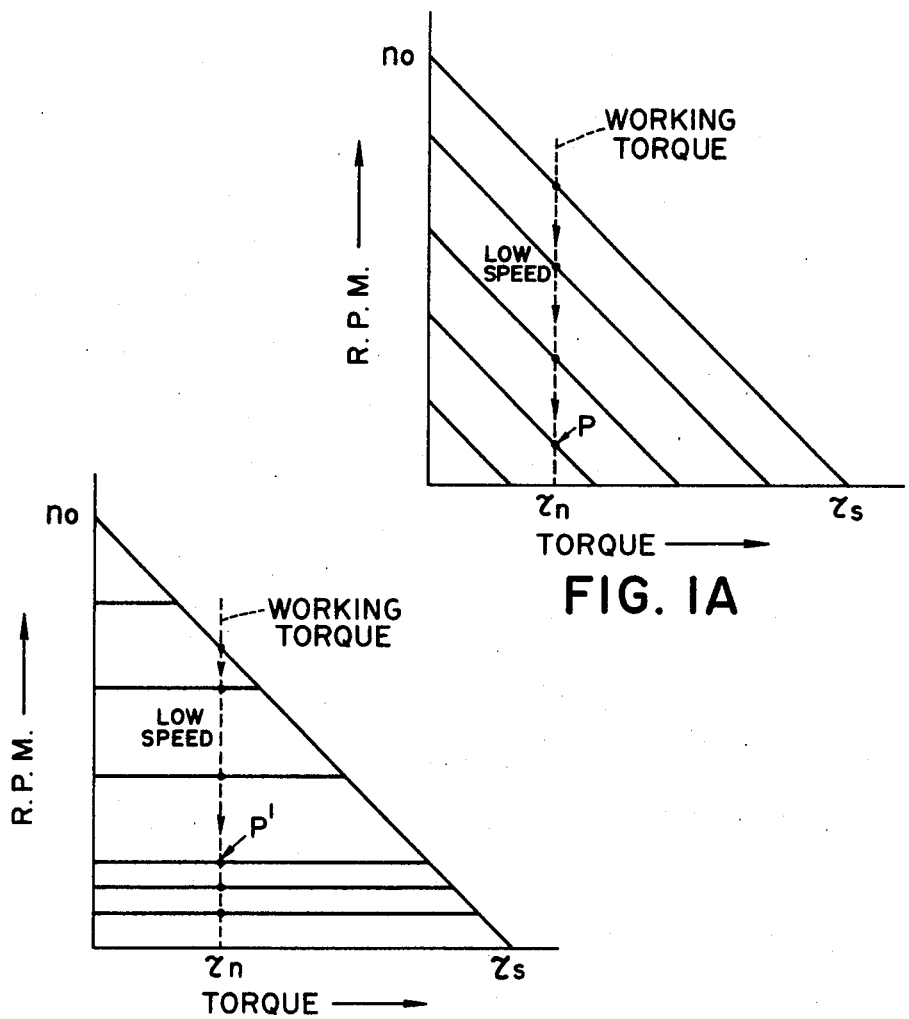
FIG. 1A
FIG. 1B
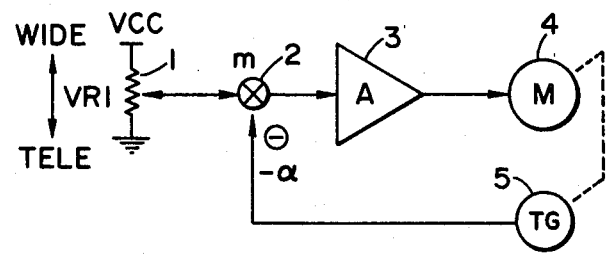
FIG. 2

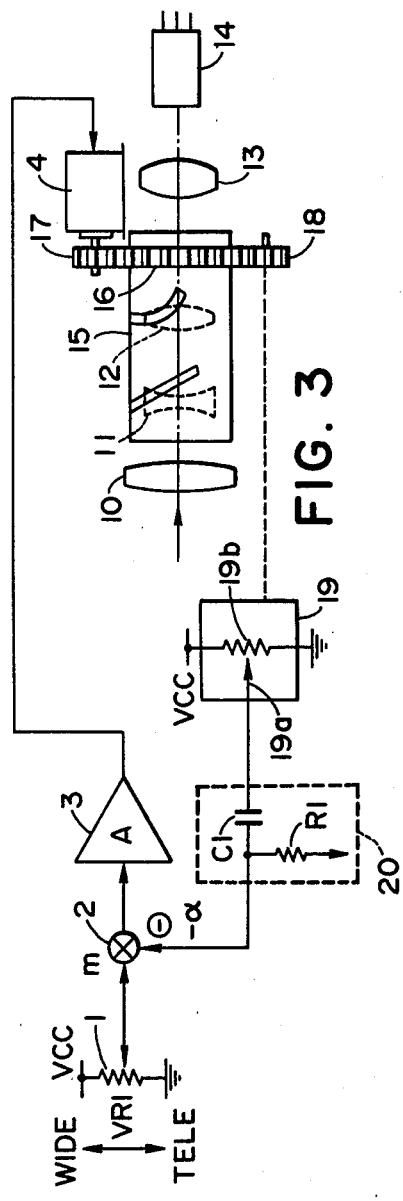
FIG. 3
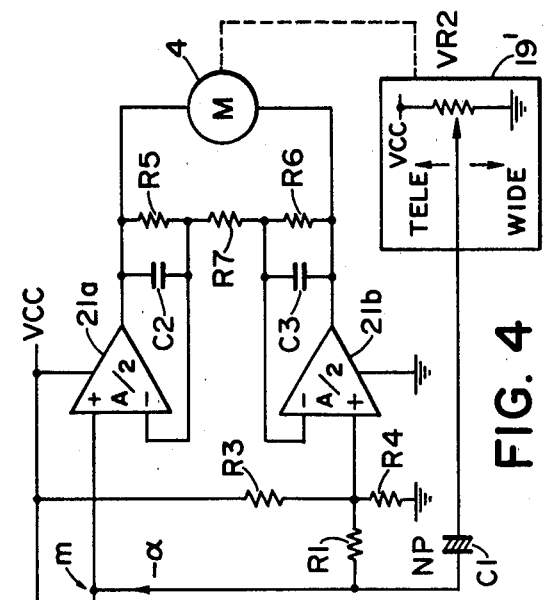
FIG. 4
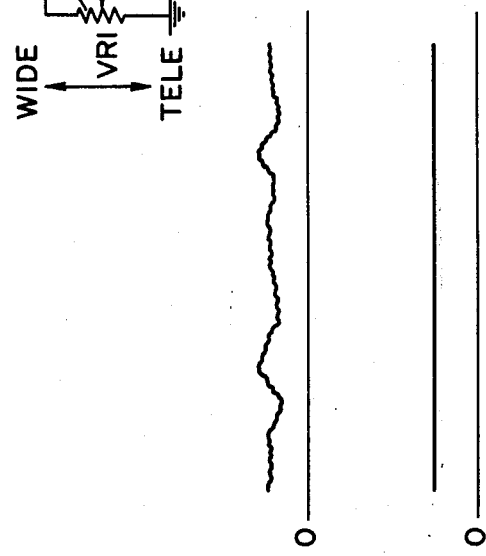
FIG. 5A
FIG. 5B

MOTION PICTURE CAMERA HAVING AN AUTO-FOCUS ADJUSTING DEVICE

BACKGROUND OF THE INVENTION

1. Field of the Invention

This invention relates to a motion picture camera having an auto-focus adjusting device for automatically focusing a shooting lens on an object and yet for permitting the auto-focusing to follow variations in the distance between the shooting lens and object.

2. Description of Prior Art

There have been various proposals with respect to the auto-focusing of the shooting lens in cameras. It has been desired to automate the focus adjustment of the camera as this is the only manual adjustment which has been left in the camera. Particularly, in motion picture cameras such as 8 mm cine-cameras, video cameras, TV cameras or the like, most of which have a zoom lens, it has been customary to take a complicated procedure in which a shooting lens is focus-adjusted after the focal length thereof has been set at maximum, that is, at the furthest viewpoint, and then to reset at such a focal length as required by an operator for shooting. For such a reason among others, it is very significant to realize an auto-focus adjustment of a shooting lens particularly in the motion picture cameras.

Upon realizing the auto-focus adjustment in the motion picture cameras, there is a problem as to the manner in which it is practically used in what manner. That is, among another, it must be determined that the shooting lens is only once auto-focus adjusted at the initial stage of a shooting or that the shooting lens is continuously auto-focus adjusted through the shooting. This problem is important in the actual shooting. If the problem is successfully settled, the shooting can be carried out very effectively.

SUMMARY OF THE INVENTION

This invention provides a motion picture camera having an auto-focus adjusting device which provides a solution for the above problem in the prior art, said auto-focus adjusting device being able to be changed to an optimum focus adjustment mode corresponding to an object which is stationary, moving, shifting from its stationary state to its moving state and vice versa, or replaced by another object.

In accordance with this invention, the motion picture camera includes an auto-focus adjusting device which can be basically operated in at least two modes. These modes are for effecting the auto-focus adjustment only once at the initial stage of a shooting and for carrying out the auto-focus adjustment continuously through the shooting. Furthermore, the motion picture camera may be instantaneously changed from one mode to another mode by a manipulation different from that for the above mode-change, or may be added by other operating function. That is, the motion picture camera can be operated; (1) in such a manner that the auto-focus adjustment is once made at any time by means of said different manipulation in the above once-only-adjustment mode or (2) in another manner that the auto-focus adjustment is made inoperative by a different manipulation to lock the shooting lens at its specific focal length in the aforementioned continuous adjustment mode. By the above mode-change manipulation, the auto-focus adjusting device may be further changed to still another mode in which it is made inoperative so that the shooting lens can be manually focused.

In an embodiment of this invention which will be described hereinafter, a motion picture camera having an auto-focus adjusting device for automatically focusing the shooting lens on an object, comprises a first manipulating means for selecting one of three different modes, a first mode in which the auto-focus adjusting device is rendered inoperative so that the shooting lens can be manually focused, a second mode in which the shooting lens is only one focused on an initial object in response to the camera release and then locked at the initial distance of focus without following variations in distance between the original object and the shooting lens, and a third mode in which the shooting lens is continuously focused throughout a period of the camera release following the variations in distance between the object and the shooting lens. The motion picture camera further comprises a second manipulation means effective only in the above second and third modes for actuating the auto-focus adjusting device once again upon the camera release in the second mode to focus and lock the shooting lens at a new focal length between the same object and the shooting lens and also for locking the auto-focus adjusting device in the third mode irrespective of the camera release to maintain the shooting lens at a focused position with respect to a distance between a specific object and the shooting lens.

As proposed in the other embodiments of this invention which will be described hereinafter, the following combinations of similar and effective mode-change operations, in addition to the aforementioned mode-change operations, may be easily carried out by simply modifying the related circuits:

(a) There are a first changing operation and a second changing operation different therefrom. The first changing operation changes between a manual-focus adjustment and an auto-focus adjustment. This auto-focus adjustment is only once made at the initial stage of a shooting. The auto-focus adjustment can be continuously made through the second changing operation when the first changing operation is in the auto-focus adjustment mode.

(b) There are a first changing operation and a second changing operation different therefrom. The first changing operation changes between a manual-focus adjustment and a continuous auto-focus adjustment throughout a period of shooting. This continuous auto-focus adjustment is locked through the second changing operation when the first changing operation is in the continuous auto-focus adjustment mode.

(c) There is a first changing operation in which an auto-focus adjustment is made.

(d) There is a first changing operation in which an auto-focus adjustment is only once made at the initial state of a shooting.

The above combinations of focus adjusting modes are effective, for example, when an object moves to another position at the initiation of shooting after a shooting lens has been focused on the object, when it is desired to shoot another object immediately after the previous object has been shot, or when it is required to avoid any effect due to other obstructive bodies that can enter into the field of view during shooting. If the focal length changes throughout the shooting, the auto-focus adjusting device is in operation. If it is not desired to change the focal length throughout the shooting, the auto-focus adjusting device is initially operated and thereafter locked to save electric power in the camera. In this case, it is also possible to avoid any effection due to other obstructive bodies that can enter the area between the camera and the object. The motion picture camera of this invention can be economically used since it is properly operated in a manner such that the shooting lens is refocused whein the object moves to another position and then is stationary at that position, or in another manner such that the shooting lens is at all times auto-focus adjusted following the moving object when it moves rapidly to change the focal length of the shooting lens successively.

Other objects and features of this invention will be apparent from the following description of the embodiments with reference to the accompanying drawings.

BRIEF DESCRIPTION OF THE DRAWINGS

Preferred embodiments of this invention will now be described in connection with the accompanying drawings in which.

DETAILED DESCRIPTION OF THE EMBODIMENTS

Figure 1:
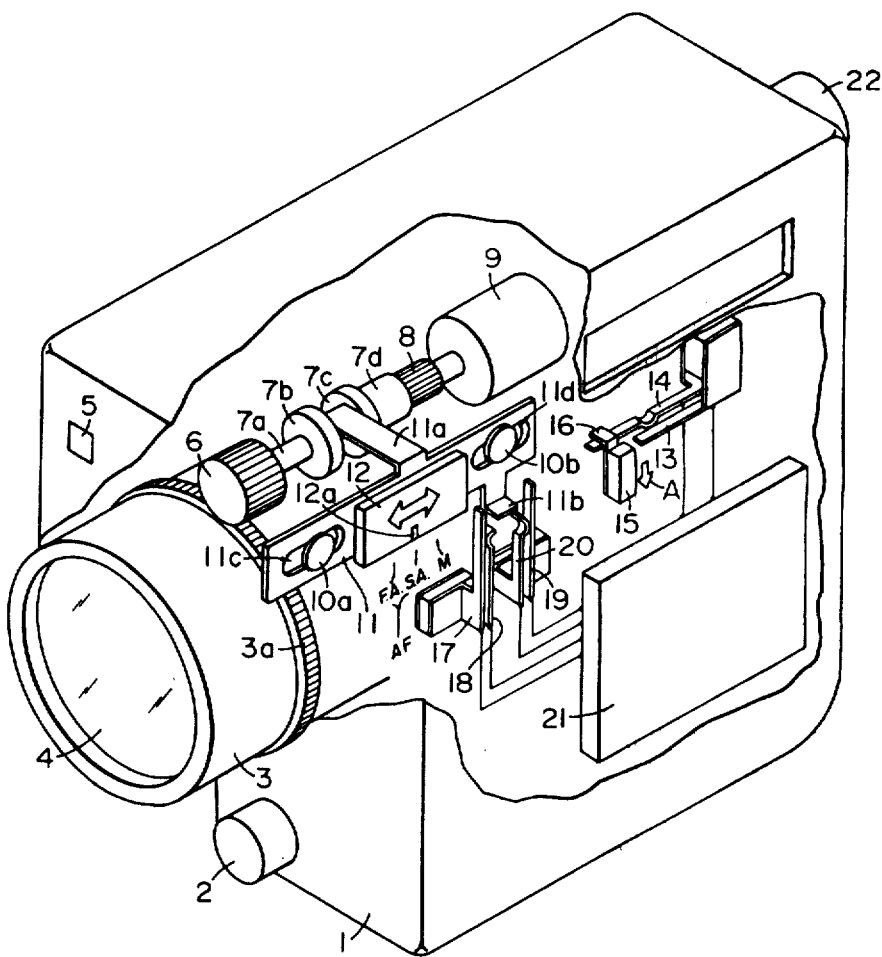
FIG. 1 is a perspective view, partially broken, of an embodiment of this invention, showing the important parts of the machine which relates to improvements in this invention.

Referring to FIG. 1, first of all, an embodiment of the motion picture camera to which this invention is applied is shown to comprise a camera body 1, a shutter release button 2, a focus lens tube 3, a lens-tube gear 3a formed integrally on the focus lens tube and driven by an auto-focus adjusting motor 9, a focus lens 4, a light-receiving window 5 for measuring the distance between the camera and an object, and a driving gear 6 for transmitting the driving force of the auto-focus adjusting motor 9 to the focus lens tube 3. The driving gear 6 is mounted on a rotating shaft 7a for rotation therewith. The shaft 7a has two changing disks 7b and 7c which are fixed thereto and engaged by a changing arm 11a. The disk 7c includes a clutch 7d mounted thereon which is adapted to engage with a roulette-shaped gear 8 in a rotating direction. The gear 8 is formed integrally on the rotating shaft of the motor 9 while the members shown by the numerals 7a–7d are connected integrally with one another to slide axially as a whole.

Guide pins 10a and 10b are engaged in slots 11c and 11d formed in a changing plate 11 which is connected with a changing knob 12. This knob 12 is thus guided by the guide pins 10a and 10b. The changing arm 11a is for selectively engaging the gear 3a with the gear 6. An arm 11b for actuating a mode-changing switch in an auto-focus adjusting circuit is formed, together with the changing arm 11a, on the changing plate 11. Reference numerals 13 and 14 designate switch contacts for controlling the auto-focus adjusting operation which can be turned on and off by means of a manipulating button 15. The manipulating button 15 may be formed integrally on the changing knob 12. An arm 16 for actuating the switches 13 and 14 is formed integrally on the button 15. Reference numerals 17, 18 and 19, 20 denote switch contacts actuated by means of the knob 12 to change the auto-focus adjustment modes. Reference numeral 21 designates an auto-focus adjusting circuit including a circuit for changing the auto-focus adjustment modes. Reference numeral 22 denotes an eye lens tube of a finder.

Figure 2:
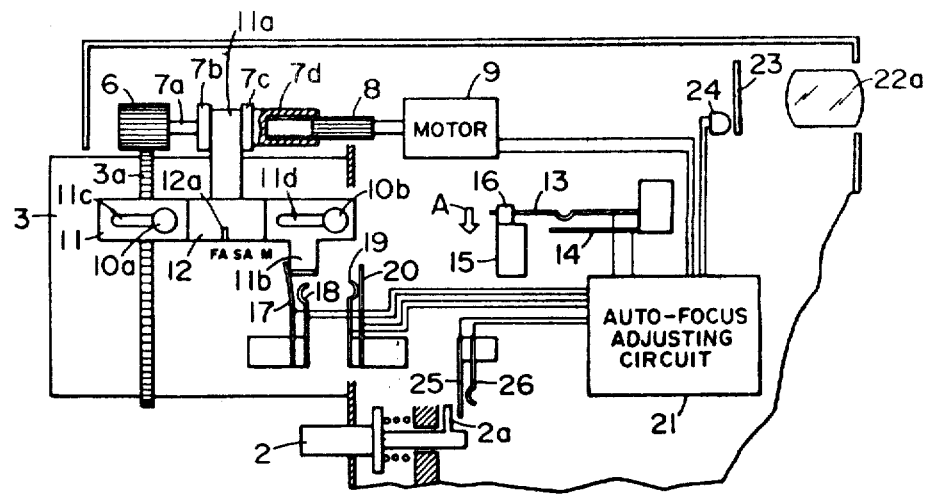
FIGS. 2, 3 and 4 illustrate the camera shown in FIG. 1 which is set in a full-automatic mode, in a semi-automatic mode and in a manual mode, respectively.
Figure 3:
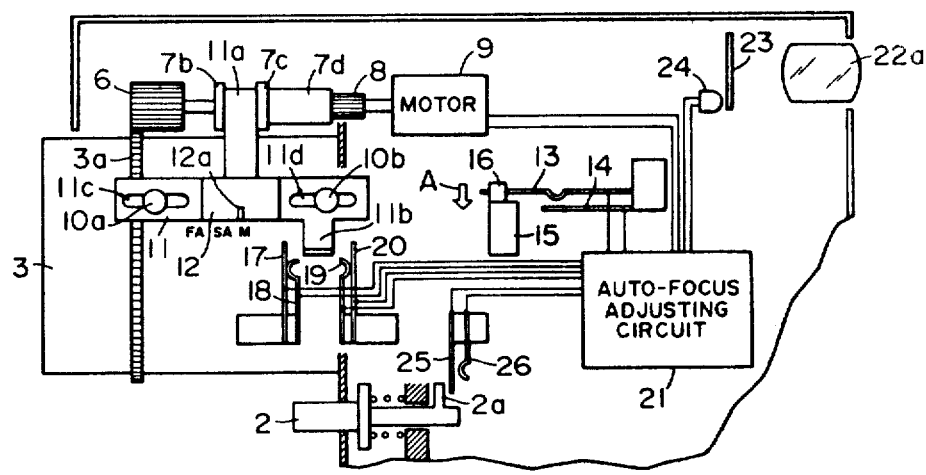
Figure 4:
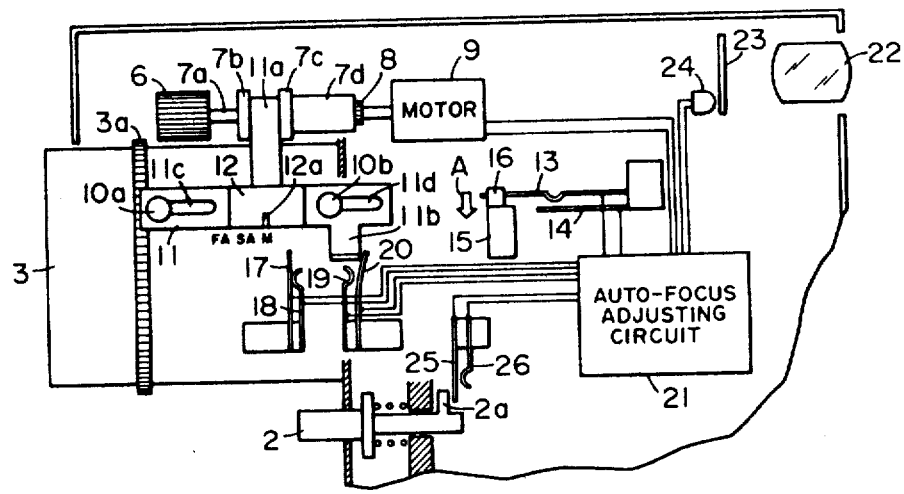

In FIGS. 2 to 4, reference numeral 22a designates an eye lens of the finder; 23 a focus mask of the finder; 24 a lamp or a display element such as LED for displaying the modes of auto-focus adjustment; 25 and 26 switch contacts actuated by means of the shutter release button 2 for operating the auto-focus adjusting circuit; and 2a a projection formed on the release button 2 for controlling the switch contacts 25 and 26.

The changing of the focus adjustment by the changing knob will now be described with reference to FIGS. 2, 3 and 4. In these figures, indexing marks "M", "SA" and "FA" are provided for a mark 12a on the knob 12. "M" indicates a manual focus adjustment; "SA" denotes a semi-automatic focus adjustment in which only one auto-focus adjustment is effected at the initial stage of a shooting; and "FA" designates a full-automatic focus adjustment in which the auto-focus adjustment is made throughout a shooting.

When the changing knob 12 is moved to the position denoted by "FA" as shown in FIG. 2, the switch contacts 17 and 18 are separated by the arm 11b while the switch contacts 19 and 20 are in engagement with each other. At the same time, the disks 7b and 7c are moved leftward by the arm 11a so that the gear 6 will be engaged by the gear 3a. Thus, the auto-focus adjusting circuit 21 is in the full-automatic focus adjustment mode wherein, when the switch contacts 25 and 26 thereof are engaged by each other upon depression of the shutter release button 2, the auto-focus adjusting circuit 21 produces an output signal by which the motor 9 is energized to drive the gear 3a. Therefore, the shooting lens can be automatically focused. In such a state, if the button 15 is moved in a direction shown by an arrow to engage the switch contacts 13 and 14 with each other during the shooting, the auto-focus adjusting circuit 21 is locked to maintain the focus lens 4 at its focused position.

When the changing knob 12 is moved to the "SA" position as shown in FIG. 3, the arm 11b is moved rightward to bring both the switch contacts 17, 18 and 19, 20 into engagement with each other. At the same time, the disks 7b and 7c are moved by the arm 11a so that the gear 6 will be moved rightward while it is still in engagement with the gear 3a. Thus, the auto-focus adjusting circuit 21 is set at the semi-automatic focus adjustment mode. If the switch contacts 25 and 26 are engaged with each other by depression of the release button 2, the auto-focus adjusting circuit 21 is only once actuated to generate an output signal by which the motor 9 is energized to drive the gear 3a so that the shooting lens will be only once focused. In this state, if the button 15 is moved in the arrow direction to turn on the switch 13, 14 during shooting, the shooting lens can be once again auto-focus adjusted. Thus, the shooting lens can be focalized upon each turning-on of the switch 13, 14 during the shooting.

When the changing knob 12 is moved to the "M" position as shown in FIG. 4, the arm 11b brings the switch contacts 19, 20 out of engagement with each other and the switch contacts 17, 18 into engagement with each other. At the same time, the disks 7b and 7c are further moved rightward by the arm 11a so that the gear 6 will be further moved rightward out of engagement with the gear 3a. Thus, the auto-focus adjusting circuit 21 is turned off. Since the gear 3a is disengaged from the gear 6, the manual focus adjustment can be made easily and smoothly.

As shown in FIGS. 2, 3 and 4, one or more lamps or display elements 24 such as LED or the like are located adjacent to the finder mask 23, so that each mode can be confirmed through the finder.

The auto-focus adjusting circuit 21 will now be described in detail with reference to FIG. 5.

Figure 5:
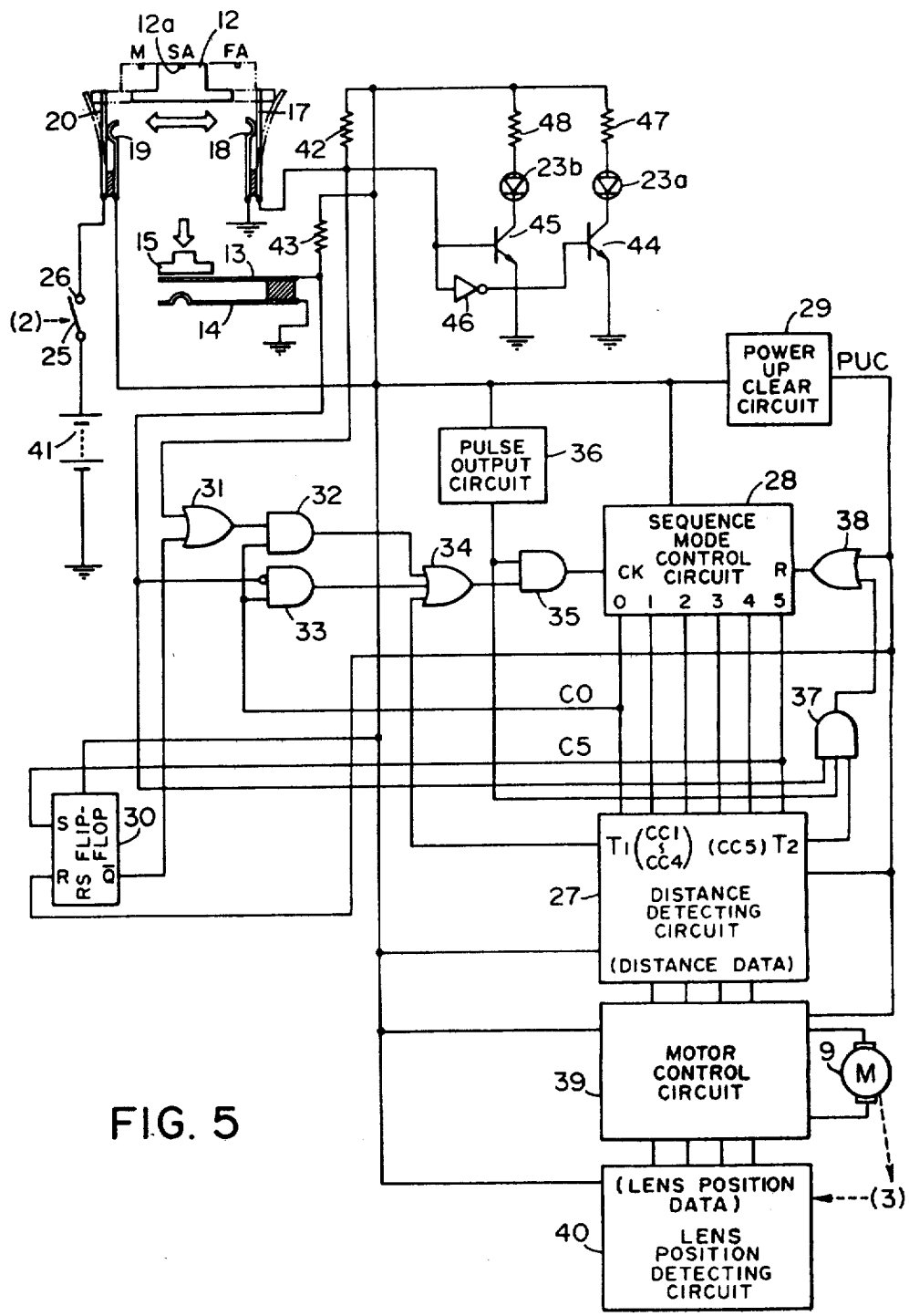
FIG. 5 is a block diagram showing an example of an auto-focus adjusting and mode control circuit which can be used in the camera shown in FIGS. 1 to 4.

As shown in FIG. 5, the auto-focus adjusting circuit 21 includes a distance detecting circuit 27 for measuring the distance between the camera and an object, for example, as described in application Ser. No. 944,974 which was filed by the applicant. Briefly speaking, in the distance measuring device proposed by the previous application, two images of objects imaged at a differential relative position which corresponds to a distance between the objects, by an optical system of base-line telemeter, are scanned by a linear image sensor such as CCD or MOS photodiode array or the like to obtain binary coded picture element data of a predetermined bit number with respect to the first view image (standard view image) and of a bit number larger than the predetermined bit number with reference to the second view image (reference view image) which is within a larger view range including the first view image, for example, two or three times. These data are stored to utilize the measuring of the distance between the object and the camera by detecting the image portion which corresponds to the first view image or the most appropriate image portion within the second view image on the basis of the stored data. The aforementioned distance detecting circuit 27 includes all of the circuit portions in the circuit system disclosed in the previous application except the sequence mode control section.

Reference numeral 28 designates a sequence mode control circuit for controlling six sequence modes shown by C0–C5 in the distance detecting circuit 27. The sequence mode control circuit 28 comprises a binary counter and a decoder which is adapted to convert the binary coded outputs from the binary counter into decimal coded outputs. The sequence modes C0–C5 are defined as in the circuit system, proposed by the previous application and therefore the distance detecting circuit 27 operates in the same manner. The first sequence mode C0 is a stand-by mode in which the system is initially set. The system remains in the stand-by mode unless an operation command is provided thereto. When the system receives the operation command, it is changed to the next sequence mode C1 which is a refresh mode for deserting ineffective data that have been stored from the linear image sensor. As the refresh mode is completed, the system is changed to the sequence mode C2 which is one for controlling the reset time of image data in the linear image sensor in accordance with the brightness of the object. When the control mode is finished, the system is changed to the subsequent mode C3 which is one for reading the outputs from the linear image sensor, binary-coding these outputs and storing binary coded data of the predetermined bit numbers with respect to the respective first and second view images as described hereinbefore. The subsequent sequence mode C4 is one for detecting a distance between the object and the camera according to the binary coded picture element data which have been stored in the previous sequence mode C3. Finally, the sequence mode C5 is one for estimating the distance data (digital data of a predetermined bit number) which have been obtained in the previous sequence mode C4 and warning if these data are wrong. These sequence modes C0–C5 of the distance detecting circuit 27 are set by the respective decimal coded signals which are generated at the output terminals "0"–"5" of the sequence mode control circuit 28. The distance data from the distance detecting circuit 27 is held in the system until it is once set at the sequence mode C5 and thereafter again set at the subsequent sequence mode C5. Furthermore, the distance detecting circuit 27 generates a high-level signal at its output terminal $T_1$ upon each termination of the sequence modes C1, C2, C3 and C4 and another high-level signal at the output terminal $T_2$ upon each termination of the sequence mode C5.

The circuit system shown in FIG. 5 also includes a power-up clear circuit 29 for outputting power-up clear pulses PUC when the system is connected to a source of electric power; a RS flip-flop 30 adapted to be reset by the power-up clear pulses PUC from the power-up clear circuit 29 and thereafter set by a high-level output from the output terminal "5" of the sequence mode control circuit 28; an OR gate 31 for obtaining a logical sum of the ON or OFF signal of the switch 17, 18 ("high" in OFF, and "low" in ON) and the $\overline{Q}$ output of the flip-flop 30; an AND gate 32 for obtaining a logical product of the output of the OR gate 31 and the output signal from the output terminal "0" of the sequence mode control circuit 28 (this output is "high" only in the sequence mode C0 and "low" in the other modes); an AND gate 33 for obtaining a logical product of the inverted signal of the ON or OFF signal from the switch 13, 14 ("high" in OFF and "low" in ON) and the output from the output terminal "0" of the sequence mode control circuit 28; an OR gate 34 for obtaining a logical sum of each output from the AND gates 32 and 33 and the output from the output terminal $T_1$ of the distance detecting circuit 27; and an AND gate 35 for obtaining a logical product of the output of the OR gate 34 and the output pulses from the pulse producing circuit 36. The last-mentioned AND gate 35 has its output which is applied to a clock input terminal CK of the sequence mode control circuit 28 as a count-up pulse for shifting the sequence modes. The pulse producing circuit 36 is designed to produce a single pulse at a predetermined cycle when the system is connected with the source of electric power and can be replaced by any known multivibrator circuit.

The circuit system shown in FIG. 5 further includes an AND gate 37 for obtaining a logical product of the output signal from the output terminal $T_2$ of the distance detecting circuit 27, the ON or OFF signal from the switch 13, 14 and the output pulse from the pulse producing circuit 36; an OR gate 38 for obtaining a logical sum of the output of the AND gate 37 and the power-up clear pulse PUC from the power-up clear circuit 29, the output of said OR gate 38 being applied to a reset terminal R of the sequence mode control circuit 28 as a reset pulse for setting the sequence mode C0; a motor control circuit 39 including a digital comparator for controlling the motor 9 to focus the lens 4 on an object by comparing the distance data from the distance detecting circuit 27 and the lens-position data produced from a lens-position detecting circuit 40 for indicating the adjusted position of the focus lens 4 by digital data of a predetermined bit number, said lens-position detecting circuit 39 having a Gray code plate or encoder plate which is coupled with the focus lens tube 3; and a source of electric power 41 in the circuit system to which the switches 19, 20 and 25, 26 are connected in series. The circuit system in FIG. 5 is adapted to be energized through these switches 19, 20 and 25, 26 from the source of electric power 41. The switches 17, 18 and 13, 14 are respectively connected in parallel to the series circuit of the switches 25, 26 and 19, 20. An electric potential on the connection between the switch 17, 18 and a resistance 42 connected with the switch 19, 20 is applied to one input of the OR gate 31 while an electric potential on the connection between the switch 13, 14 and a resistance 43 connected with the switch 19, 20 is applied to the inverted input of the AND gate 33 and one input of the AND gate 37, respectively.

A display element 23a, which is a LED for displaying the "SA" mode, is connected between a protective resistance 47 and the collector side of a npn switching transistor 44 which is adapted to respond to the output of an invertor 46 for causing the switch 17, 18 to produce its ON or OFF signal under inversion logic (that is, "low" in OFF and "high" in ON) upon turning-on of the switches 19, 20 and 25, 26. Another display element 23b, which is a LED for displaying the "FA" mode, is connected between a protective resistance 48 and the collector side of a npn switching transistor 45 which is adapted to respond to the ON or OFF signal from the switch 17, 18 upon turning-on of the switches 19, 20 and 25, 26.

Each of the modes in the aforementioned circuit system will now be described:

(1) Manual focus adjustment mode (M)

When the knob 12 is set at the "M" position, the switch 19, 20 is turned off so that the circuit system shown in FIG. 5 will not be energized even if the switch 25, 26 is turned on by depressing the release button 2. Thus, the manual focus adjustment mode will be set. At this time, both the LED elements 23a and 23b are turned off. Therefore, the manual focus adjustment mode can be confirmed through the finder of the camera. It is also apparent that the button 15 is completely ineffective in this manual mode. As described hereinbefore, moreover, the lens tube 3 is separated from the driving gear train of the motor 9.

(2) Semi-automatic focus adjustment mode (SA)

When the knob 12 is set at the "SA" position, both the switches 17, 18 and 19, 20 are turned on. Upon turning-on the switch 25, 26 by depression of the release button 2, the circuit system in FIG. 5 is energized so that the power-up clear circuit 29 will produce power-up clear pulses PUC to reset the sequence mode control circuit 28, the distance detecting circuit 27, the motor control circuit 37 and the flip-flop 30. Consequently, the output from the output terminal "0" of the sequence mode control circuit 28 becomes "high" so that the distance detecting circuit 27 will be set at the sequence mode C0 and so that the output $\overline{Q}$ of the flip-flop 30 will be "high". The output of the AND gate 32 will be then "high" so that the pulses from the pulse producing circuit 36 will be applied to the clock input terminal CK of the sequence mode control circuit 28 through the AND gate 35 for causing the sequence mode control circuit 28 to count up by one count. Therefore, the output from the output terminal "1" of the sequence mode control circuit 28 will be "high" so that the distance detecting circuit 27 will be shifted to the sequence mode C1. This shift of the distance detecting circuit 27 to the mode C1 causes the output from the terminal "0" of the circuit 28 to become "low" so that the output of the AND gate 32 will be also "low".

When the sequence mode C1 is terminated, the output from the terminal $T_1$ of the distance detecting circuit 27 becomes "high" so that the output pulse of the pulse producing circuit 3 will be again applied to the clock input terminal CK of the sequence mode control circuit 28 through the AND gate 35. Consequently, the sequence mode control circuit 28 is further counted up by one count to cause the output from the terminal "2" thereof to become "high". Thus, the distance detecting circuit 27 will be shifted to the sequence mode C2. Similar operations are subsequently repeated until the sequence mode C5 is attained. In the sequence mode C5, data of the distance between the object and the camera at this point of time will be produced from the distance detecting circuit 27. The distance data are compared with the lens-position data supplied at the same time from the lens-position detecting circuit 40 in the motor control circuit 39 so that the motor 9 will be controlled to focus the focus lens 4 on the object. Furthermore, at the sequence mode C5, the output from the terminal "5" of the sequence mode control circuit 28 becomes "high" so that the flip-flop 30 will be set to change its output $\overline{Q}$ to the "low" state. Accordingly, even if the output from the terminal "0" of the sequence mode control circuit 28 subsequently becomes "high", the output of the AND gate 32 remains "low".

When the sequence mode C5 is terminated, the output from the terminal $T_2$ of the distance detecting circuit 27 becomes "high" so that, if the switch 13, 14 is not closed, the pulse producing circuit 36 will supply pulses through the AND gate 37. These pulses are applied to the reset terminal R of the sequence mode control circuit 28 through the OR gate 38 so that this control circuit will be reset to change the output from the terminal "0" thereof to the "high" state. Consequently, the distance detecting circuit 27 will be returned to the sequence mode C0. However, since the output $\overline{Q}$ of the flip-flop 30 is in the "low" state at this point of time as aforementioned, the output of the AND gate 32 remains "low" so that the distance detecting circuit 27 will continue to produce the distance data obtained by the previous sequence loop while being held at the sequence mode C0. Accordingly, the focus lens 4 will be locked at its focused position for the object. It is understood from the foregoing that the focus lens 4 can be only once auto-focus adjusted at the initial stage of a shooting upon depression of the release button 2 when the knob 12 is set at the "SA" position.

If the switch 13, 14 is in its closed position at a point that the sequence mode C5 is attained, the AND gate 37 does not produce any pulse so that the distance detecting circuit 27 will be locked at the sequence mode C5. On the other hand, if the switch 13, 14 is opened, the distance detecting circuit 27 will be returned to the sequence mode C0 and then locked at the same mode.

In such a state that the distance detecting circuit 27 is locked at the sequence mode C0 after the auto-focus adjustment has been once made, if the switch 13, 14 is closed by depressing the button 15, the output of the AND gate 33 becomes "high" so that the pulses from the pulse producing circuit 36 will be supplied through the AND gate 35 to cause the sequence mode control circuit 28 to count up. Therefore, the distance detecting circuit 27 is again actuated to measure the distance between the camera and the object. If the resulting distance data are different from those in the previous measurement, the motor control circuit 39 is actuated to refocus the focus lens 4 according to the new distance data. Similarly, if the switch 13, 14 is in its closed position at a point of time that the sequence mode C5 is accomplished, the distance detecting circuit 27 is locked at the sequence mode C5. If the switch 13, 14 is opened at this time, the distance detecting circuit 27 is returned to the sequence mode C0 and then locked at the same mode. Thus, the auto-focus adjustment will be once made upon each depression of the button 15.

When the switch 17, 18 is closed while the switches 19, 20 and 25, 26 are in their closed positions in this mode, the transistor 44 is energized while the transistor 45 is inoperative so that the display element 23a of LED will be turned on to display the "SA" mode of the camera in the finder thereof.

(3) Full-automatic focus adjustment mode (FA)

When the knob 12 is set at the "FA" position, the switch 17, 18 is opened so that the output of the OR gate 31 will remain "high" unless the switch 25, 26 is in its closed position by depressing the release button 2. Therefore, the sequence mode control circuit 28 is counted up by the pulses from the AND gate 35 immediately after the control circuit 28 has been reset by the pulses from the OR gate 38. Consequently, the distance detecting circuit 27 repeats its shifting operation from the sequence mode C0 to the sequence mode C5 unless the switch 25, 26 is in its closed position. Thus, the auto-focus adjustment will be continuously made unless the release button 2 continues to be depressed.

When the switch 13, 14 is closed by depressing the button 15 in this "FA" mode, the pulses from the AND gate 37 are interrupted at the same time as the sequence mode C5 is terminated so that the distance detecting circuit 27 will be locked at the sequence mode C5. Thus, the focus is being locked unless the switch 13, 14 is in its closed position under depression of the button 15. As the switch 13, 14 is opened, the AND gate 37 produces pulses to reset the sequence mode control circuit 28 so that the continuous auto-focus adjustment will be again initiated as described previously.

Furthermore, when the switch 17, 18 is opened while the switches 19, 20 and 25, 26 are in their closed positions, the transistor 45 is energized while the transistor 44 is inoperative so that the display element 23b of LED will be turned on to indicate the "FA" mode of the camera in the finder thereof.

Figure 6:
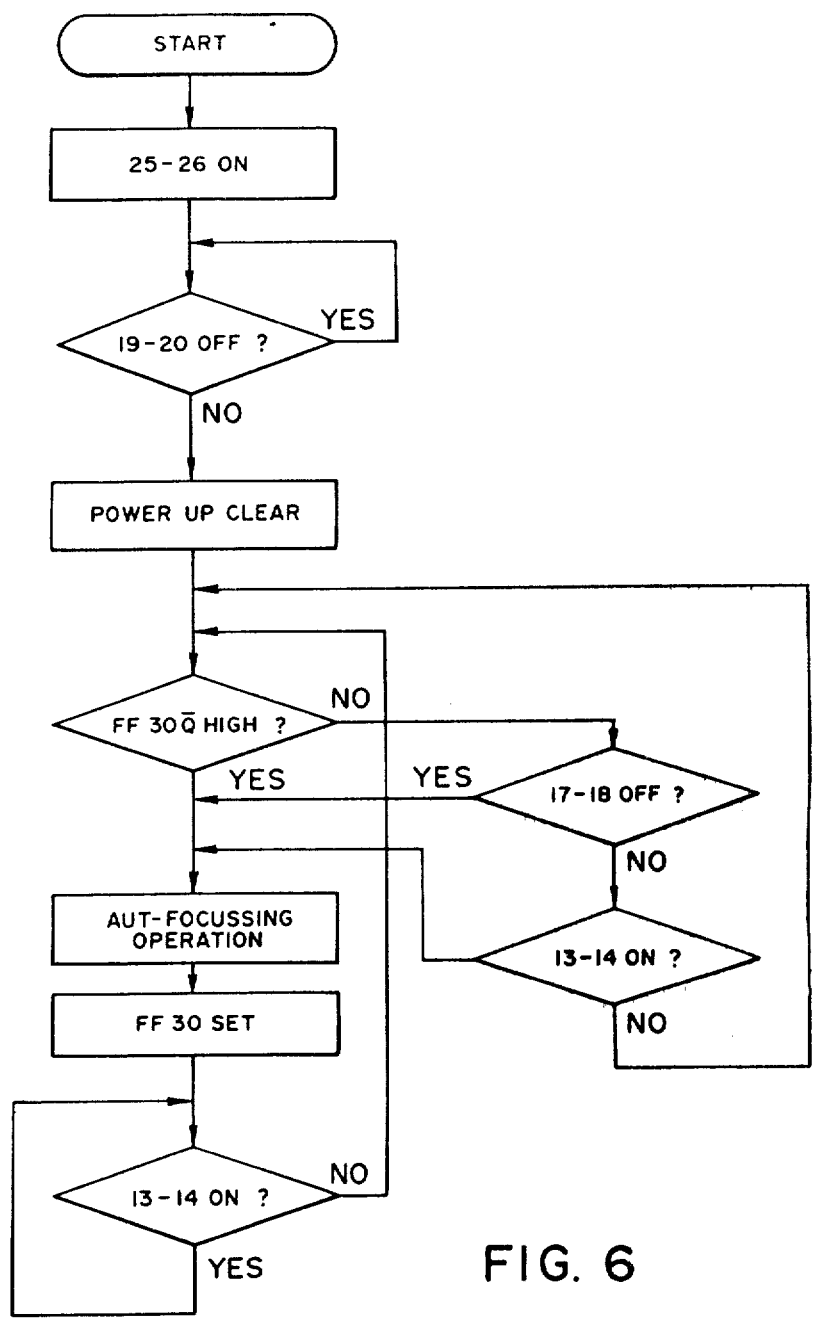
FIG. 6 is a flow chart showing the operational sequence in the respective modes in the circuit shown in FIG. 5.

The aforementioned shifting sequence of the modes is illustrated by a flow-chart in FIG. 6.

As apparent from the above description, the motion picture camera of this invention is extremely effective since it can be set at an appropriate form of focus adjustment according to the state of an object or of a source of electric power by selecting the desired operating position of the camera. Furthermore, the lens tube can be smoothly manual-operated by disconnecting it with the auto-focus adjusting motor in the manual mode of the camera.

The other embodiments of the above changing means 12, it will now be described with reference to FIGS. 7 and 8.

Figure 7A:
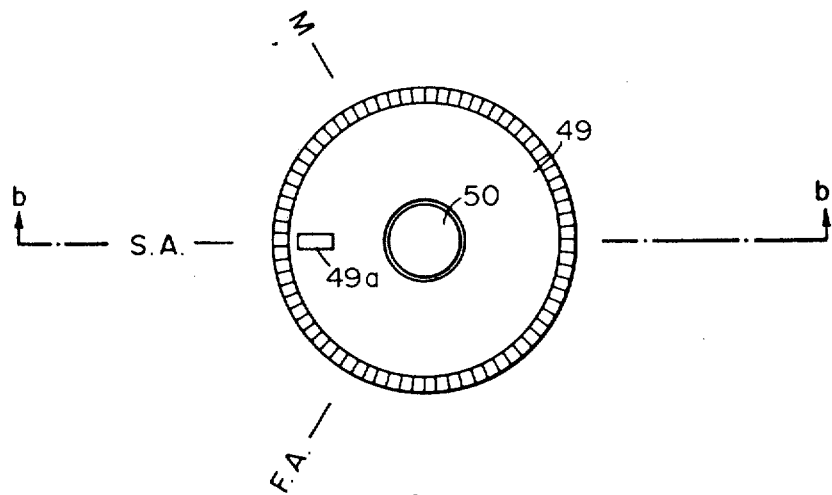
FIG. 7A is a front view of another example of a mode changing means.
Figure 7B:
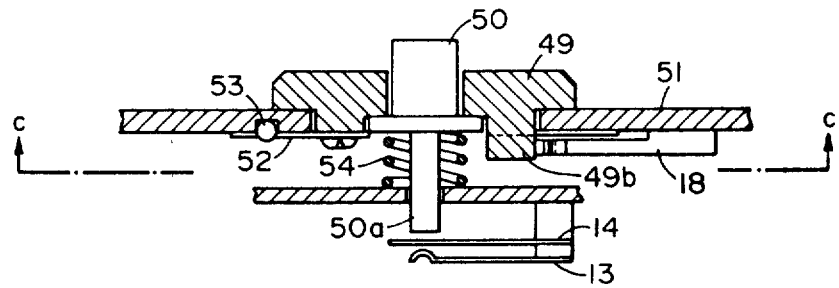
FIG. 7B is a cross-sectional view taken along a line b—b in FIG. 7A.
Figure 7C:
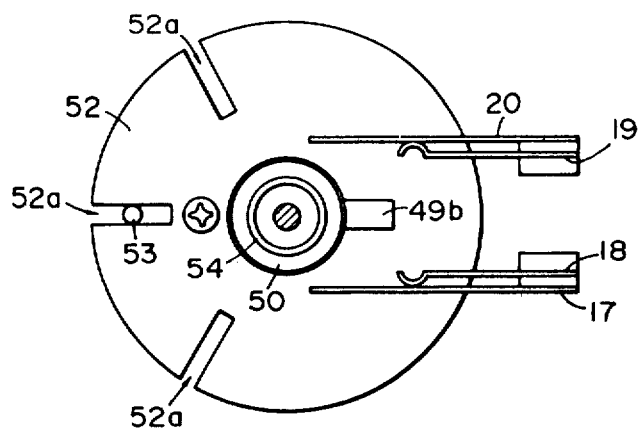
FIG. 7C is a cross-sectional view taken along a line c—c in FIG. 7B.

In FIGS. 7A, 7B and 7C, reference numeral 49 denotes a mode-changing knob; 49a a mark; 49b a switch actuating piece; 50 an operating button; 51 a housing of the camera body; 52 a click plate having click slots 52a for positioning the changing knob 49; 53 a click ball; and 54 a return spring for the operating button 50.

The changing means shown in FIG. 7 comprises two manipulating members as in the first embodiment shown in FIG. 1. However, these two manipulating members are assembled into a unit. The knob 49 can be rotated to three mode positions, that is, the manual, semi-automatic and full-automatic positions as described hereinbefore. The mode changing can be made in a manner similar to that of FIG. 1, and the switches 17, 18 and 19, 20 are controlled by the switch actuating piece 49b of the knob 49 to select three modes. When the knob 49 is set at the "SA" position, the auto-focus adjustment can be once made upon each closing of the switch 13, 14 by depressing the button 50. When the knob 49 is set at the "FA" position, the auto-focus adjustment can be locked by closing the switch 13, 14 upon depression of the button 50.

Figure 8A:
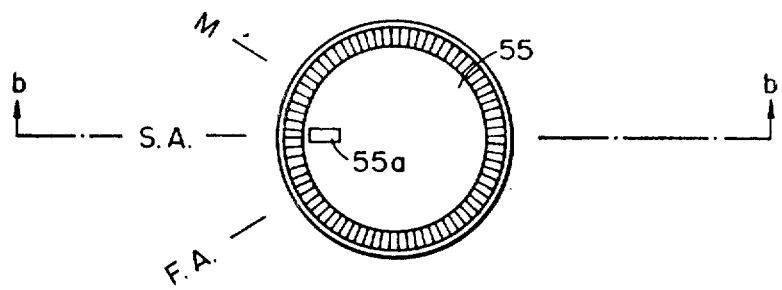
FIG. 8A is a front view of still another example of the mode changing means.
Figure 8B:
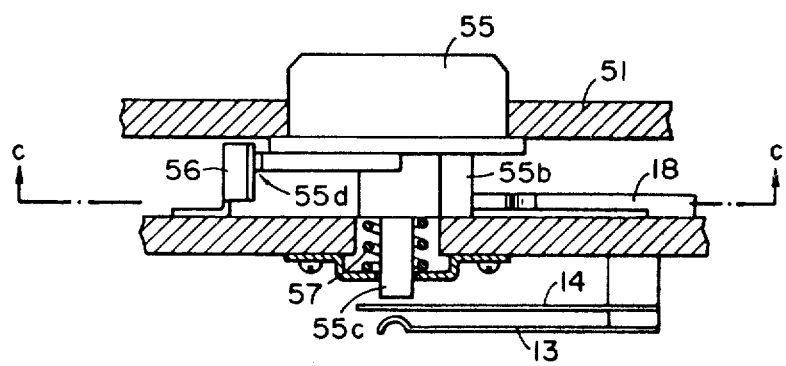
FIG. 8B is a cross-sectional view taken along a line b—b in FIG. 8A.
Figure 8C:
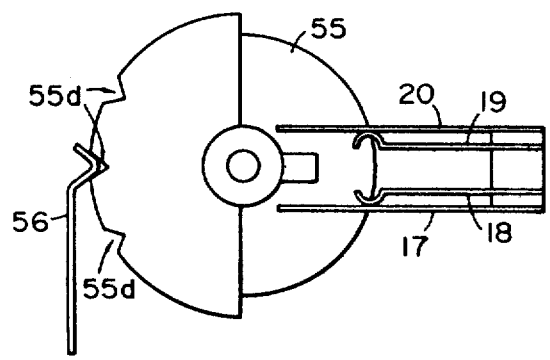
FIG. 8C is a cross-sectional view taken along a line c—c in FIG. 8B.

FIG. 8 shows still another embodiment of a changing means having a single changing knob which can be used to effect the same mode-changing operation as in the embodiment of FIG. 7. The knob 55 can be rotated to each of the "M", "SA" and "FA" positions and also depressed axially to close the switch 13, 14. When the knob 55 is in the "SA" position, the auto-focus adjustment can be once made upon each axial depression of the knob 55 for closing the switch 13, 14. When the knob is in the "FA" position, the auto-focus adjustment is locked while the knob 55 is being depressed axially to close the switch 13, 14. In FIG. 8, reference numeral 55d designates a click portion for positioning the knob 55; 56 a spring for stopping the click portion; 55a a mark for the knob 55; 55b a switch operating portion for the switches 17, 18 and 19, 20; 55c a switch operating portion for the switch 13, 14; and 57 a return spring for the knob 55.

Finally, examples of combinations of the changing modes which are different from the previous combinations of the changing modes will now be described with reference to FIGS. 9, 10 and 11.

Figure 9:
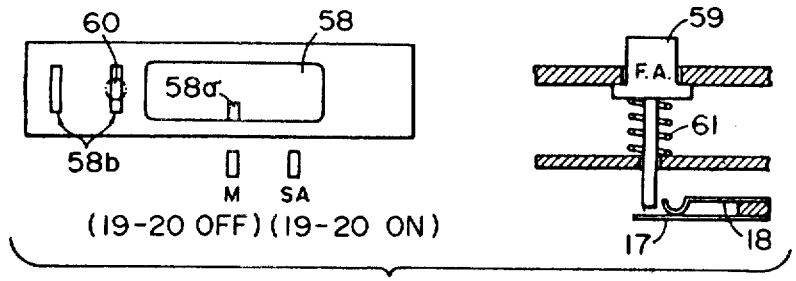
FIGS. 9, 10 and 11 illustrate three examples of the changing means which can be applied when the combination of the changing modes.

First of all, FIG. 9 illustrates a changing means including first and second manipulating members 58 and 59. The camera can be set at either of the manual (M) mode or the semi-automatic (SA) mode by means of the first manipulating member 58. When the first manipulating member 58 is in its semi-automatic (SA) position, the camera can be set at the full-automatic (FA) mode during depression of the second manipulating member 59. In this arrangement, the switch 19, 20 is opened when the first manipulating member 58 is moved to the "M" position and closed by the first member 58 in the "SA" position. The switch 17, 18 is opened by depressing the second manipulating member 59. The switch 13, 14 is omitted. In FIG. 9, reference numeral 58a denotes a mark; 58b click slots; 60 a click ball; and 61 a return spring for the second manipulating member 59.

Figure 10:
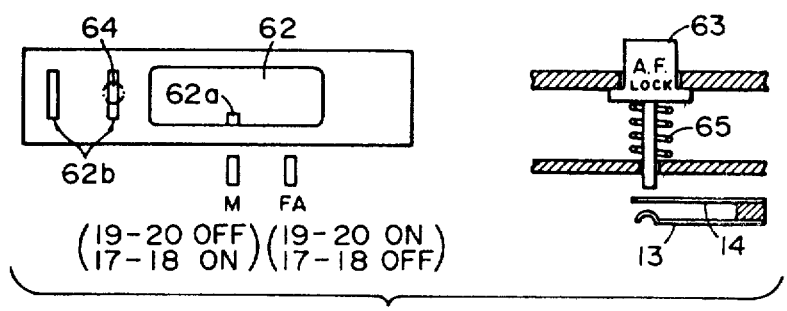

FIG. 10 shows a changing means including first and second manipulating members 62 and 63. The camera can be set at either of the manual mode or the full-automatic mode by means of the first manipulating member 62. When the first manipulating member 62 is in the full-automatic position shown by "FA", the auto-focus adjustment can be locked during depression of the second manipulating member 63. In such an arrangement, when the first manipulating member 62 is moved to its manual (M) position, the switch 17, 18 is closed while the switch 19, 20 is opened. Conversely, when the first member 62 is moved to its full-automatic (FA) position, the switch 17, 18 is opened while the switch 19, 20 is closed. The switch 13, 14 is closed by depressing the second manipulating member 63. In FIG. 10, reference numeral 62a designates a mark; 62b click slots; 64 a click ball; and 65 a return spring for the second manipulating member 63.

Figure 11:
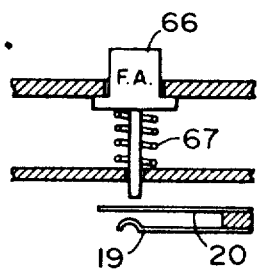

A changing means shown in FIG. 11 includes a single manipulating member 66 by which the camera can be set at either of the manual mode or the full-automatic mode. During depressing of the manipulating member 66, the auto-focus adjustment can be continuously made. In this embodiment, the manipulating member 66 is depressed to close the switch 19, 20. Both the switches 17, 18 and 13, 14 are omitted. The member 66 can be returned to its original position by means of a return spring 67.

These embodiments in FIGS. 9, 10 and 11 can be carried out by slightly changing the circuit shown in FIG. 5. In the embodiment shown in FIG. 9, the circuit system in FIG. 5 may be modified such that the switch 13, 14 and AND gate 33 are omitted while the OR and AND gates 34 and 37 are replaced by OR and AND gates each having two inputs, respectively. In this case, the auto-focus adjustment cannot be once again made in the mode "SA". In the embodiment shown in FIG. 10, the circuit system of FIG. 5 may be modified such that the flip-flop 30, OR gate 31 and AND gate 33 are omitted, the ON or OFF signal of the switch 17, 18 is directly applied to one input of the AND gate 32, and the OR gate 34 is replaced by an OR gate having two inputs. In the embodiment of FIG. 11, the circuit system may be changed such that the switch 19, 20 is in the form of a normally-opened switch, and the switches 17, 18 and 13, 14, flip-flop 30, OR gate 31 and AND gates 32, 33 are omitted. Furthermore, the OR and AND gates 34, 37 are respectively replaced by OR and AND gates each having two inputs. The OR gate 34 is such designed as to receive the output from the terminal "0" of the sequence mode control circuit 28.

It is to be understood from the above description that the motion picture camera according to this invention is particularly effective when it is used according to the state of an object in the following manner:

(1) When the object is moving, the motion picture camera is operated in the full-automatic mode that the auto-focus adjustment is made throughout a period of shooting.

(2) When the moving object stops, the auto-focus adjustment is locked in the full-automatic mode.

(3) When the object is stationary, the motion picture camera is operated in the semi-automatic mode that the auto-focus adjustment is only once made at the initial stage of a shooting.

(4) When the stationary object begins to move, the camera is changed from the semi-automatic mode to the full-automatic mode or auto-focus adjusted once again by means of the manipulating button.

(5) When the stationary object moves to another place and then stops at the same place, the camera is refocused on the object in the place in the semi-automatic mode.

When the electric power drops, the camera is changed to the manual mode wherein the motor is disconnected with the lens tube gear so that the manual focus adjustment can be smoothly made. When the shooting lense is shifted forcedly out of its focused position with respect to the stationary object in the full-automatic mode or other mode, the shooting lens can be automatically returned back to the focused position since the focus detecting signals are stored in the camera. Thus, the motion picture camera of this invention is effective in controllability and reliability for focusing. It is further convenient that the camera includes display elements 23a and 23b for indicating the changed mode in the finder so that any mode can be easily confirmed through the finder by an operator, as shown in FIG. 5.

What we claim is:

1. An automatic focusing system comprising:
 (a) a focus adjustable lens means adapted to be focused on an object;
 (b) an automatic focusing means for automatically focusing said lens means on the object;
 (c) actuating means for actuating said automatic focusing means;
 (d) mode selecting means for selecting a focusing mode of the system, said mode selecting means being selectively set at one of first, second and third positions;
 (e) supplementary means having non-operated and operated positions; and
 (f) control means responsive to said trigger means, mode selecting means and supplementary means to control the operation of said automatic focusing means, said control means
 (1) setting said automatic focusing means at an inoperative state in which said automatic focusing means is inoperative irrespective of the operation of said actuating means and in which said lens means is permitted to be manually adjusted, when said mode selecting means is set at said first position;
 (2) operating said automatic focusing means only once in response to each of the operations of said actuating means and supplementary means and holding said automatic focusing means ineffective irrespective of changes in the distance between the system and the object after once said lens means has been focused on the object, when said mode selecting means is set at said second position; and
 (3) continuously operating said automatic focusing means in response to said actuating means as long as said supplementary means is in the non-operated position while holding said automatic focusing means ineffective as long as said supplementary means is in the operated position, when said mode selecting means is set at said third position.

2. The system according to claim 1, further comprising:
 means for indicating the set position of said mode selecting means.

3. The system according to claim 1, wherein said mode selecting means and supplementary means are disposed at different positions spaced apart from each other.

4. The system according to claim 1, wherein said supplementary means is of depression type, and said mode selecting means is of rotary type, which is rotatable substantially around said supplementary means.

5. The system according to claim 1, 2, 3 or 4, wherein said automatic focusing means includes:
driving means for driving said lens means to perform the automatic focusing; and
clutch means for selectively connecting said driving means with said lens means, said clutch means being operatively associated with said mode selecting means to disconnect said driving means from said lens means when said mode selecting means is set at said first position and to connect said driving means with said lens means when said mode selecting means is set at either said second or third position.

6. An automatic focusing system comprising:
(a) a focus adjustable lens means adapted to be focused on an object;
(b) an automatic focusing means for automatically focusing said lens means on the object;
(c) trigger means for actuating said automatic focusing means;
(d) mode selecting means for selecting a focusing mode of the system, said mode selecting means being operable in two different types of operations, in the first type of operation said mode selecting means being selectively set at one of first, second and third positions and in the second type of operation said mode selecting means being changed between first and second states; and
(e) control means responsive to said trigger means and mode selecting means to control the operation of said automatic focusing means, said control means
(1) setting said automatic focusing means at an inoperative state in which said automatic focusing means is inoperative irrespective of the operation of said trigger means and in which said lens means is permitted to be manually adjusted, when said mode selecting means is set at said first position;
(2) operating said automatic focusing means only once in response to the operation of said trigger means and to the change of said mode selecting means from said first state to said second state and holding said automatic focusing means ineffective irrespective of changes in the distance between the system and the object after once said lens means has been focused on the object, when said mode selecting means is set at said second position; and
(3) continuously operating said automatic focusing means in response to said trigger means as long as said mode selecting means is in the first state while holding said automatic focusing means ineffective as long as said mode selecting means is in the second state, when said mode selecting means is set at the third position.

7. The system according to claim 6, further comprising:
means for indicating the set position of said mode selecting means in said first type of operation.

8. The system according to claim 6, wherein the first type of operation of said mode selecting means is of rotation type so that it is rotated between said first, second and third positions, and the second type of operation said mode selecting means is of depression type so that it is changed between the first-non-depressed state and the second-depressed-state.

9. The system according to clalim 6, 7 or 8, wherein said automatic focusing means includes:
driving means for driving said lens means to perform automatic focusing; and
clutch means for selectively connecting said driving means with said lens means, said clutch means being operatively associated with said first type of operation of said mode selecting means to disconnect said driving means from said lens means when said mode selecting means is set at said first position and to connect said driving means with said lens means when said mode selecting means is set at either said second or third position.

10. An automatic focusing system comprising:
(a) a focus adjustable lens means adapted to be focused on an object;
(b) an automatic focusing means for automatically focusing said lens means on the object;
(c) trigger means for actuating said automatic focusing means;
(d) mode selecting means for selecting a focusing mode of the system, said mode selecting means being selectively set at one of first and second positions;
(e) supplementary means having non-operated and operated positions; and
(f) control means responsive to said trigger means, mode selecting means and supplementary means to control the operation of said automatic focusing means, said control means
(1) setting said automatic focusing means at an inoperative state in which said automatic focusing means is inoperative irrespective of the operation of said trigger means and in which said lens means is permitted to be manually adjusted, when said mode selecting means is set at said first position;
(2) operating said automatic focusing means only once in response to the operation of said trigger means and holding said automatic focusing means ineffective irrespective of changes in the distance between the system and the object after once said lens means has been focused on the object, when said mode selecting means is set at said second position; and
(3) continuously operating said automatic focusing means in response to said trigger means as long as said supplementary means is in the operated position, when said mode selecting means is set at the second position.

11. The system according to claim 10, further comprising:
means for indicating the set position of said mode selecting means.

12. The system according to claim 10, wherein said mode selecting means and supplementary means are disposed at different positions spaced apart from each other.

13. The system according to claim 10, wherein said supplementary means is of depression type, and said mode selecting means is of slide type.

14. The system according to claim 10, 11, 12 or 13, said automatic focusing means includes;
driving means for driving said lens means to perform the automatic focusing; and
clutch means for selectively connecting said driving means with said lens means, said clutch means being operatively associated with said mode selecting means to disconnect said driving means from said lens means when said mode selecting means is set at said first position and to connect said driving means with said lens means when said mode selecting means is set at said second position.

* * * * *

UNITED STATES PATENT AND TRADEMARK OFFICE
CERTIFICATE OF CORRECTION

PATENT NO. : 4,371,240

DATED : February 1, 1983

INVENTOR(S) : Ichiro Shimizu et al.

It is certified that error appears in the above-identified patent and that said Letters Patent is hereby corrected as shown below:

The title page should be deleted to appear as per attached title page.

The sheets of drawings should be deleted to appear as per attached sheets.

Signed and Sealed this

Twenty-fifth Day of October 1983

[SEAL]

Attest:

GERALD J. MOSSINGHOFF

Attesting Officer

Commissioner of Patents and Trademarks

United States Patent
Shimizu et al.

[11] 4,371,240
[45] Feb. 1, 1983

[54] MOTION PICTURE CAMERA HAVING AN AUTO-FOCUS ADJUSTING DEVICE

[75] Inventors: Ichiro Shimizu, Tokyo; Yoshio Komine, Yokohama; Makoto Masunaga, Tokyo, all of Japan

[73] Assignee: Canon Kabushiki Kaisha, Tokyo, Japan

[21] Appl. No.: 188,247

[22] Filed: Sep. 17, 1980

[30] Foreign Application Priority Data

Sep. 25, 1979 [JP] Japan .............................. 54-123005

[51] Int. Cl.³ .............................................. G03B 3/00
[52] U.S. Cl. .................................................. 352/140
[58] Field of Search .............................. 352/140, 139

[56] References Cited

U.S. PATENT DOCUMENTS

| | | | |
|---|---|---|---|
| 3,504,965 | 4/1970 | Lustig | 352/140 |
| 3,517,597 | 6/1970 | Rauffer | 352/140 |
| 3,724,937 | 4/1973 | Jenkins et al. | 352/140 |
| 3,871,756 | 3/1975 | Stieringer, et al. | 352/140 |
| 4,093,365 | 6/1978 | Isono | 352/140 |
| 4,103,309 | 7/1978 | Massa | 352/140 |

FOREIGN PATENT DOCUMENTS 50-99729  8/1975  Japan .

*Primary Examiner*—Monroe H. Hayes
*Attorney, Agent, or Firm*—Fitzpatrick, Cella, Harper & Scinto

[57] ABSTRACT

This application discloses a motion picture camera having an automatic focus (auto-focus) adjusting device for automatically focusing a shooting lens on an object. The motion picture camera includes a first manipulating means for selecting one mode of the following three modes, a first mode in which said auto-focus adjusting device is rendered inoperative so that the shooting lens can be manually focused; a second mode in which, in response to the camera release, the shooting lens can be auto-focus adjusted by said auto-focus adjusting device only once and thereafter held at a locked position irrespective of variations in distance between the shooting lens and object; and a third mode in which, throughout a period of the camera release, the shooting lens can be continuously auto-focus adjusted by said auto-focus adjusting device, following the variations in distance between the shooting lens and object, and a second manipulating means effective only in said second and third modes for permitting the shooting lens to be auto-focus adjusted by said auto-focus adjusting device again only once during the camera release in the second mode and for holding the shooting lens at its locked position irrespective of the camera release in the third mode.

14 Claims, 15 Drawing Figures

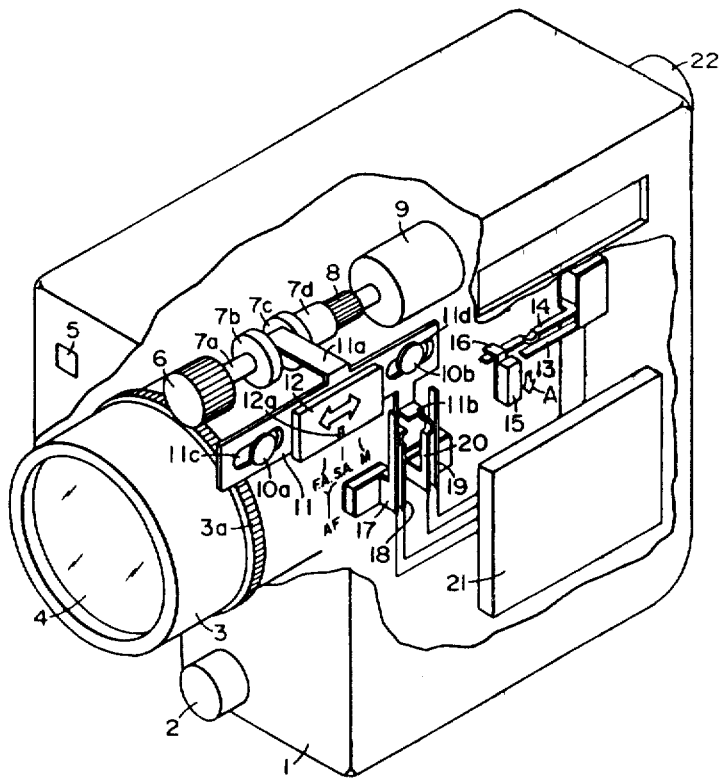

UNITED STATES PATENT AND TRADEMARK OFFICE
CERTIFICATE OF CORRECTION

PATENT NO. : 4,371,240

DATED : February 1, 1983

INVENTOR(S) : ICHIRO SHIMIZU, ET AL.

It is certified that error appears in the above-identified patent and that said Letters Patent is hereby corrected as shown below:

COLUMN 1

Line 31, delete "in what manner".

Line 32, delete "among another,".

Lines 35 and 54, "through" should read --throughout--.

Line 58, "other" should read --another--.

COLUMN 2

Line 11, "one" should read --once--.

Lines 35 and 44, "are" should read --is--.

COLUMN 3

Line 2, "effection" should read --effect--.

Line 7, "whein" should read --when--.

Line 47, "when" should read --with--.

COLUMN 5

Line 10, "focalized" should read --focused--.

UNITED STATES PATENT AND TRADEMARK OFFICE
CERTIFICATE OF CORRECTION

PATENT NO. : 4,371,240
DATED : February 1, 1983
INVENTOR(S) : ICHIRO SHIMIZU, ET AL.

It is certified that error appears in the above-identified patent and that said Letters Patent is hereby corrected as shown below:

COLUMN 8

Line 23, "3" should read --36--.

COLUMN 10

Line 11, "it" should read --15--.

Signed and Sealed this

Second Day of April 1985

[SEAL]

Attest:

DONALD J. QUIGG

Attesting Officer        Acting Commissioner of Patents and Trademarks